United States Patent
Gossain et al.

(10) Patent No.: US 8,995,354 B2
(45) Date of Patent: Mar. 31, 2015

(54) METHOD FOR SELECTING COMMUNICATION LINKS IN A MULTI-RADIO WIRELESS COMMUNICATION SYSTEM

(75) Inventors: Hrishikesh Gossain, Lake Mary, FL (US); Charles R. Barker, Orlando, FL (US); Keith J. Goldberg, Casselberry, FL (US); Avinash Joshi, Lake Mary, FL (US)

(73) Assignee: Symbol Technologies, Inc., Holtsville, NY (US)

( * ) Notice: Subject to any disclaimer, the term of this patent is extended or adjusted under 35 U.S.C. 154(b) by 1058 days.

(21) Appl. No.: 12/433,688

(22) Filed: Apr. 30, 2009

(65) Prior Publication Data

US 2010/0278118 A1 Nov. 4, 2010

(51) Int. Cl.
*H04W 4/00* (2009.01)
*H04W 40/02* (2009.01)
*H04L 12/751* (2013.01)
*H04W 40/24* (2009.01)
*H04W 84/18* (2009.01)

(52) U.S. Cl.
CPC ............. *H04W 40/02* (2013.01); *H04L 45/026* (2013.01); *H04W 40/24* (2013.01); *H04W 84/18* (2013.01)
USPC .......................................... 370/329; 370/255

(58) Field of Classification Search
CPC ..................................................... H04L 45/026
USPC .................................................. 370/255, 329
See application file for complete search history.

(56) References Cited

U.S. PATENT DOCUMENTS

| | | | |
|---|---|---|---|
| 7,031,293 B1 | 4/2006 | Srikrishna et al. | |
| 7,522,537 B2 * | 4/2009 | Joshi | 370/254 |
| 7,685,264 B2 * | 3/2010 | Tumsi Dayakar et al. | 709/221 |
| 2007/0121529 A1 * | 5/2007 | Meier | 370/256 |
| 2008/0107075 A1 | 5/2008 | Ramachandran et al. | |
| 2008/0316997 A1 | 12/2008 | Zeng et al. | |
| 2008/0317047 A1 * | 12/2008 | Zeng et al. | 370/401 |
| 2010/0074194 A1 * | 3/2010 | Liu et al. | 370/329 |
| 2010/0128628 A1 * | 5/2010 | Wu et al. | 370/252 |

FOREIGN PATENT DOCUMENTS

| | | |
|---|---|---|
| WO | WO2008036756 A2 | 3/2008 |
| WO | 2008097221 A1 | 8/2008 |

OTHER PUBLICATIONS

Unghee Lee et al; "OLSR-MC: A Proactive Routing Protocol for Multi-Channel Wireless Ad-Hoc Networks"—Wireless Communications and Networking Conference 2006, IEEE—4 pages.*
Bouckaert, et al., "Distributed On Demand Channel Selection in Multi Channel, Multi Interface Wireless Mesh Networks," Proc., IEEE Globecom 2007, pp. 5086-5091.
PCT/US1020/031840—International Search Report with Written Opinion mailing date Jul. 30, 2010—16 pages.

* cited by examiner

*Primary Examiner* — Yemane Mesfin
*Assistant Examiner* — Henry Baron

(57) ABSTRACT

A method provides for selecting a communication interface towards an access point by a wireless communication device. The method includes receiving one or more HELLO messages from the access point; determining whether any of a plurality of communication links is being used to reach the access point by evaluating at least one field of each of the received HELLO messages; penalizing a link metric of a communication link when the communication link is being used; and selecting a communication interface towards the access point, wherein the selected communication interface is coupled to a best communication link having a best link metric.

14 Claims, 6 Drawing Sheets

METHOD FOR SELECTING COMMUNICATION LINKS IN A MULTI-RADIO WIRELESS COMMUNICATION SYSTEM

FIELD OF THE DISCLOSURE

The present disclosure relates generally to wireless communications and more particularly to a method for intelligently selecting communication links in a multi-radio wireless communication system.

BACKGROUND

An infrastructure-based wireless network typically includes a communication network with fixed and wired gateways. Many infrastructure-based wireless networks employ a mobile unit which communicates with a fixed base station or access point that is coupled to a wired network. The mobile unit can move geographically while it is communicating over a wireless link to the base station or access point. When the mobile unit moves out of range of one base station or access point, it may connect or "handover" to a new base station or access point and starts communicating with the wired network through the new base station or access point.

In comparison to infrastructure-based wireless networks, an ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network. Because the topology of an ad hoc network can change significantly techniques are needed which can allow the ad hoc network to dynamically adjust to these changes. Due to the lack of a central controller, many network-controlling functions can be distributed among the nodes such that the nodes can self-organize and reconfigure in response to topology changes.

One characteristic of the nodes is that each node can directly communicate over a short range with nodes which are a single "hop" away. Such nodes are sometimes referred to as "neighbor nodes." When a node transmits packets to a destination node and the nodes are separated by more than one hop (e.g., the distance between two nodes exceeds the radio transmission range of the nodes, or a physical barrier is present between the nodes), the packets can be relayed via intermediate nodes ("multihopping") until the packets reach the destination node. As used herein, the term "multihop network" refers to any type of wireless network which employs routing protocols among nodes which are part of a network. In such situations, each intermediate node routes the packets (e.g., data and control information) to the next node along the route, until the packets reach their final destination. Nodes in the ad hoc network use end-to-end path metrics to select a path, from the multiple path options to any destination. The path metrics are generally sum of the individual link metrics along the path.

A wireless mesh network is a collection of wireless nodes or devices organized in a decentralized manner to provide range extension by allowing nodes to be reached across multiple hops. In a multi-hop network, communication packets sent by a source node can be relayed through one or more intermediary nodes before reaching a destination node. A large network can be realized using intelligent access points (IAP) which provide wireless nodes with access to a wired backhaul.

A multi radio communication device supports two or more different wireless interfaces. The wireless interfaces, for example, can provide interfaces to different networks or alternatively can provide interfaces to different channels within a network. For example, a multi radio cellular telephone can provide Bluetooth communications and/or can support wireless fidelity (Wi Fi) along with its cellular data network.

A multi radio node within an ad hoc or mesh network can include multiple different radio modules supporting one or more channels and/or one or more communication protocols. (e.g., one radio module which complies with the Institute of Electrical and Electronics Engineers (IEEE) 802.11(a) standard, another radio module which complies with the IEEE 802.11(g) standard, and possibly another radio module which complies with the IEEE 802.11(b) standard, etc.). Each radio module typically has its own physical (PHY) layer, and its own medium access control (MAC) layer. A routing module which manages routing for the multi radio node is typically implemented above the MAC layer and potentially can run over multiple radios.

The IEEE 802.11 PHY specification permits the simultaneous operation of multiple non-overlapping channels. For example, three non-overlapping channels in the 2.4 GHz band can be simultaneously used. The IEEE 802.11a specification allows up to twelve non-overlapping channels in the 5.0 GHz band. By deploying multi-radio routers in wireless mesh networks and assigning the radios to non-overlapping channels, the routers can communicate simultaneously with minimal interference in spite of being in direct interference range of each other. Therefore, the capacity of wireless mesh networks can be increased.

The mesh network architecture is broadly composed of two processes: neighbor discovery and reactive routing. Neighbor discovery uses hello messages to determine neighbors and proactively propagate Internet Access Point (IAP) connectivity information. Reactive routing has many messages (e.g. route request (RREQ), route reply (RREP), route error (RERR), etc.) related to route discovery, route maintenance, and route binding.

To accommodate multiple radio operation, an enhancement to the mesh network architecture includes a node identification (ID) in hello messaging and in the neighbor table. This node ID is used to identify messages received from multiple radio interfaces as being from the same mesh node.

The availability of multiple radios could be used to increase throughput by using alternate channels to receive and forward mesh traffic. Accordingly, there is a need for a method and apparatus for intelligently selecting communication links in a multi-radio wireless communication system to increase system throughput.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
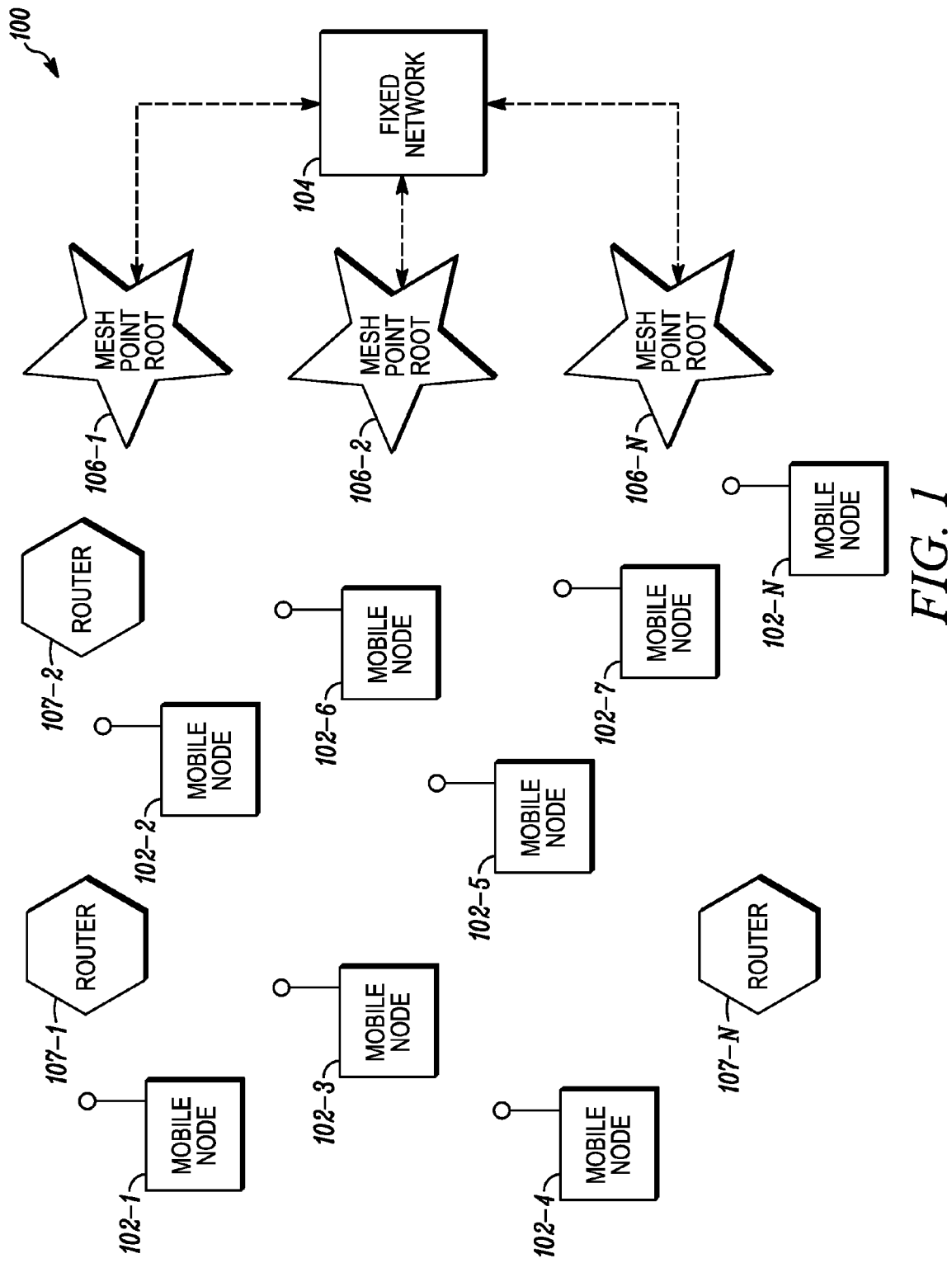
FIG. 1 is a block diagram illustrating an example of a communication network.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In accordance with some embodiments, a distributed method of channel selection in a wireless mesh network is provided. Further, a distributed multi-radio channel selection algorithm is provided including a distributed method of channel selection for both wired and wireless radio links at a given node based on channel information received in routing control frames (e.g. Hello messages, route reply (RREP) etc). In accordance with some embodiments, a method of channel renegotiation between a node and its previous hop based on interference and an available list of channels is further provided.

FIG. 1 is a block diagram illustrating an example of a communication network 100. The communication network 100 can be a mesh enabled architecture (MEA) network, an Institute of Electrical and Electronics Engineers (IEEE) 802.11 network (i.e. 802.11a, 802.11b, 802.11g, 802.11e or 802.11s), or any other packetized mesh communication network. Any of the IEEE standards or specifications referred to herein may be obtained at http://standards.ieee.org/get-ieee802/index.html or by contacting the IEEE at IEEE, 445 Hoes Lane, PO Box 1331, Piscataway, N.J. 08855-1331, USA.

As illustrated in FIG. 1, the communication network 100 includes a plurality of mobile nodes 102-1 through 102-*n* (referred to generally as nodes 102 or mobile nodes 102 or mobile communication devices 102 or mesh points 102), and can, but is not required to, include a fixed network 104 having a plurality of Mesh Point Roots (MPR) 106-1, 106-2, . . . 106-*n* (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, a public switched telephone network (PSTN) and the Internet. The communication network 100 further can include a plurality of fixed or mobile routers (MR) 107-1 through 107-*n* (referred to generally as nodes 107 or communication devices 107) for routing data packets between other nodes 102, 106 or 107. It is noted that for purposes of this discussion, the nodes discussed above can be collectively referred to as "nodes 102, 106 and 107", or simply "nodes" or alternatively as "communication devices."

As can be appreciated by one skilled in the art, the nodes 102, 106 and 107 are capable of communicating with each other directly or indirectly. When communicating indirectly, one or more other nodes 102, 106 or 107, can operate as a router or routers for forwarding or relaying packets being sent between nodes.

For clarity, a Mesh Point is, for example, an IEEE 802.11 entity that contains an IEEE 802.11 conformant Medium Access Control (MAC) and Physical Layer (PHY) interface to the Wireless Medium (WM), is within a wireless local area network (WLAN) Mesh, and supports WLAN Mesh Services. A Mesh Access Point (AP) is any Mesh Point that is also an Access Point. A Mesh Point Root (MPR) is a point at which mobile subscriber devices exit and enter a wireless local area network (WLAN) Mesh to and from other parts of a communication network.

Mesh Network deployments are engineered to ensure an interconnected backhaul network of mesh routers exists. The mesh routers form a tree below a particular Mesh Point Root. From a network graph perspective mesh network deployments tend to be fairly sparse and tree-like. This style of deployment is chosen to reduce the number of mesh routers required to cover a particular area and therefore reduce overall network cost.

Figure 2:
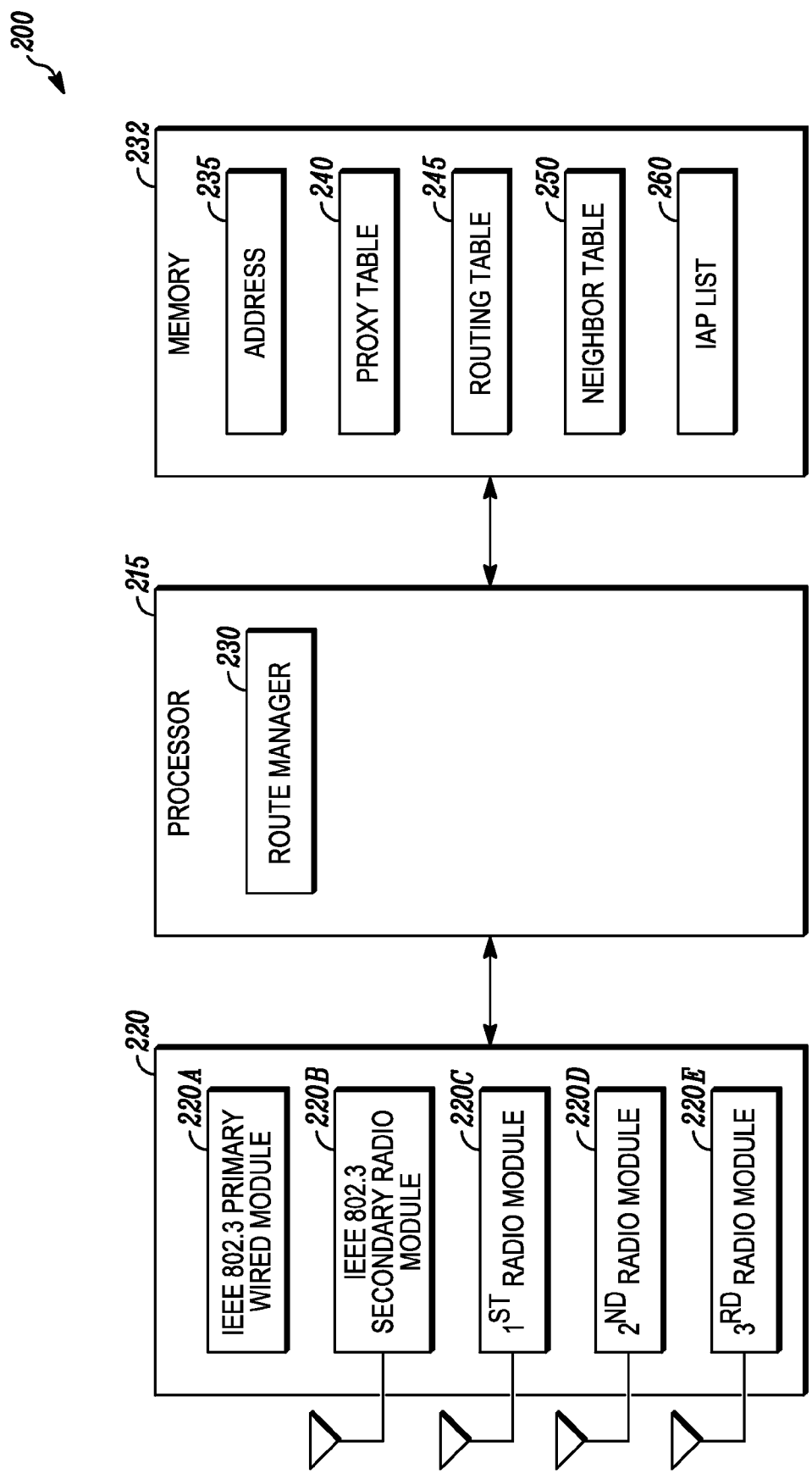
FIG. 2 is an electronic block diagram illustrating a multi-radio communication device in accordance with some embodiments.

FIG. 2 is an electronic block diagram of a multi-radio meshed node or communication device 200 in accordance with some embodiments. The communication device 200, for example, can be one or more of the nodes 102, 106, and 107 of FIG. 1. In accordance with some embodiments; the communication device 200 can be referred to as "a mesh routable device." As illustrated, the multi-radio meshed device 200 includes a plurality of communication modules 220, a processor 215, and a memory 232.

Each of the communication modules 220 can be either a wired or a wireless communication module. For example, as shown, communication module 220A is an IEEE 802.3 primary wired module, while communication modules 220B through 220E are various radio modules. It will be appreciated by those of ordinary skill in the art that any number or combination of wired and/or wireless communication modules 220 can be included within a communication device 200 in accordance with implementation of the various embodiments.

It will further be appreciated that each of the communication modules 220 can operate over at least one frequency different from that of the other radio modules, and has a particular radio configuration which supports certain data rates or sets of data rates, and can use a particular medium access control (MAC) protocol different from that of the other radio modules such as Carrier Sense Multiple Access With Collision Avoidance (CSMA/CA), Multiple Access with Collision Avoidance (MACA), Time Division Multiple Access (TDMA), Code Division Multiple Access (CDMA), Orthogonal Frequency Division Multiple Access (OFDMA) etc. Each of the radio modules 220A-220E includes its own physical (PHY) layer (not shown) and medium access control (MAC) layer (not shown) which comply with at least one radio network or radio network standard. Each PHY layer operates according to its own set of physical layer parameters (e.g., supported data rates, radio frequency (RF) channels, carrier spacing; modulation technique, coding techniques, etc.).

As illustrated, each of the communication modules 220A, 220B are illustrated as being compliant with the IEEE 802.3 standard in which communication module 220A is specifically for a wired IAP node. Examples of standards which the radio modules 220C-220E may comply with can include, but are not limited to, IEEE 802.11 network standards including 802.11a, 802.11b, 802.11g, 802.11n, 802.11e or 802.11s, and IEEE 802.16 network standards including 802.16j, and IEEE 802.15 network standards including 802.15.3, 802.15.4, etc. Radio modules 2202C-220E may also comply with a proprietary radio network such as a mesh enabled architecture (MEA) network, or any other packetized mesh communication network.

In accordance with some embodiments, each of the communication modules 220 includes at least one of a transceiver and a transmitter and a receiver module. Further, each of the radio modules includes at least one antenna. Each antenna, or alternatively the transceiver directly in the case of a wired communication module, intercepts transmitted signals from one or more nodes 102, 106, 107 within the communication network 100 and transmits signals to the one or more nodes 102, 106, 107 within the communication network 100. The antenna is coupled to the transceiver, which employs conventional demodulation techniques for receiving and which employs conventional modulation techniques for transmitting communication signals, such as packetized signals, to and from the associated radio module within the multi-radio meshed device 200 under the control of the processor 215. The packetized data signals can include, for example, voice, data or multimedia information, and packetized control signals, including node update information. When a transceiver receives a command from the processor 215, the transceiver sends a signal via the antenna to one or more devices within the communication network 100. It will be appreciated by one of ordinary skill in the art that other similar electronic block diagrams of the same or alternate type can be utilized for the various communication modules 220. Each communication module 220 is operatively coupled to the processor 215 for supporting multi radio communication operations.

The processor 215 in some embodiments includes a route manager 230 for managing packet forwarding within the communication network 100 Although the route manager 230 can be contained within the processor 215 as illustrated, in alternative implementations, the route manager 230 can be an individual unit operatively coupled to the processor 215 (not shown). It will be appreciated by those of ordinary skill in the art that the route manager 230 can be hard coded or programmed into the node 200 during manufacturing, can be programmed over-the-air upon customer subscription, or can be a downloadable application. It will be appreciated that other programming methods can be utilized for programming the route manager 230 into the multi-radio meshed device 200. It will be further appreciated by one of ordinary skill in the art that route manager 230 can be hardware circuitry within the multi-radio meshed device 200.

To perform the necessary functions of the multi-radio meshed device 200, the processor 215 and/or the route manager 230 are each coupled to the memory 232, which preferably includes a random access memory (RAM), a read-only memory (ROM), an electrically erasable programmable read-only memory (EEPROM), and flash memory. It will be appreciated by those of ordinary skill in the art that the memory 232 can be integrated within the multi-radio meshed device 200, or alternatively, can be at least partially contained within an external memory such as a memory storage device. The memory 232 comprises an address table 235, proxy table 240, routing table 245, and a neighbor table 250.

The address table 235 includes storage locations for the storage of one or more identifying addresses such as the node ID of the multi-radio meshed device 200 and MAC addresses of the particular MAC modules in each radio module 220A-220E of the multi-radio meshed device 200. In accordance with embodiments of the present invention, the multi-radio meshed device 200 needs a unique Node ID to identify the multi-radio system as a single node even though, there may be more than one MAC module controlled by the route manager 230 (also referred to as a mesh routing core (MRC)), and each MAC module has its own unique MAC address (e.g., different MAC addresses for each MAC module). As used herein, the term "node ID," refers to the unique ID identifying the multi-radio meshed device 200. As used herein, the term "interface MAC address," refers to a MAC address of a particular communication module 220A-220E within the multi-radio meshed device 200. Each communication module 220A-220E in the multi-radio meshed device 200 and its corresponding MAC module has its own interface MAC address. In one embodiment, the "interface MAC address," of the MAC module which powers up first is also used as the "node ID," which identifies the multi-radio meshed device 200. In order to avoid node identifier module confusion due to failure of the first MAC, the "node ID" which identifies the multi-radio meshed device 200 will not be changed as long as the multi-radio meshed device 200 is alive. Thus, once the device 200 is powered up, it keeps the same node ID and will not change it due to the failure of any MAC module in this device. Each multi-radio meshed device 200 will maintain single destination sequence number for itself.

Because the multi-radio meshed device 200 is a routable or "meshed" device/node, the memory 232 further includes storage locations for maintaining or storing a proxy table 240 and a routing table 245. The routing table 245 and the proxy table 240 are maintained to identify a non-routable or non-meshed device 200 and its corresponding AP (routable device) 205; non-meshed devices are proxied by meshed devices. These tables can also be combined to create a single forwarding table.

To do the proxy routing for the non-routing devices, the route manager 230 of multi-radio meshed device 200 also maintains a proxy table to store all the information regarding the proxy nodes associated with this multi-radio meshed device 200 through different interfaces. The proxy table 240 typically contains an entry for each device that is associated with the multi-radio meshed device 200 (e.g., each device that is being proxied by the multi-radio meshed device 200). A multi-radio meshed device 200 can also have nodes or devices associated with it through a wired Ethernet port or through some other wired/wireless protocol like IEEE 802.15, Token Ring, or the like as can be appreciated by one skilled in the art. A proxy table 240 of a multi-radio meshed device 200 may also contain entries for non-meshed devices that are associated with other nodes but use that node as an intermediate node to communicate with other devices in the network.

The route manager 230 maintains a routing table 245 to store the route information concerning routes to other meshed devices. The node 200 constantly updates its routing table 245 so as to maintain a consistent and up-to-date view of the network. When the network topology changes the nodes propagate update messages throughout the network in order to maintain consistent and up-to-date routing information about the whole network. These routing protocols vary in the method by which the topology change information is distributed across the network and the number of necessary routing-related tables.

As will be appreciated by those of ordinary skill in the art, in contrast to single-radio routing architectures, the data structures used in this multi-radio routing architecture also maintain related interface MAC addresses in addition to the node ID. The route manager 230 of the multi-radio meshed device 200 consults both the proxy table 240 and the routing table 245 to determine how to forward a data packet it has either generated or has received.

The route manager 230 also maintains a neighbor table 250 in memory 232 that contains the most current information about the neighbor nodes of the multi-radio meshed device 200. The multi-radio meshed device 200 maintains a list of neighbor nodes in the neighbor table 250. Neighbor nodes are added to the neighbor table 250 when the multi-radio meshed device 200 receives a communication from a neighbor node which indicates that the particular neighbor node is in communication range of the multi-radio meshed device 200. For example, in one implementation, a neighbor node will be added to the neighbor table 250 if the multi-radio meshed device 200 receives a HELLO message from that neighbor node. The route manager 230 maintains separate expiry timers for each neighbor on each interface. These expiry timers are updated every time a HELLO message is heard (or another directed message is received) from the neighbor node on that interface. Thus, in contrast to single-radio routing architectures, the data structures used in this multi-radio routing architecture also maintains interface information for each neighbor node.

In a multi-radio environment, Mesh Points (MPs) should be able to intelligently select its radio links such that its link towards a Mesh Point Root (MPR) is different (non-overlapping) than two of its previous hop wireless neighbors (if present). Further, the MP can then use alternate interfaces to receive and forward mesh traffic.

Pipelining is a technique wherein a mesh point (MP) intelligently selects its radio links to its mesh point root (MPR) such that its link towards its MPR is different (non-overlapping) than two of its previous hop wireless neighbors (if present) and use alternate interfaces to receive and forward mesh traffic. Pipelining could be provided either through manual or auto configuration. In some embodiments described herein, an auto configuration mode of pipelining is provided.

Auto Configuration

Figure 3:
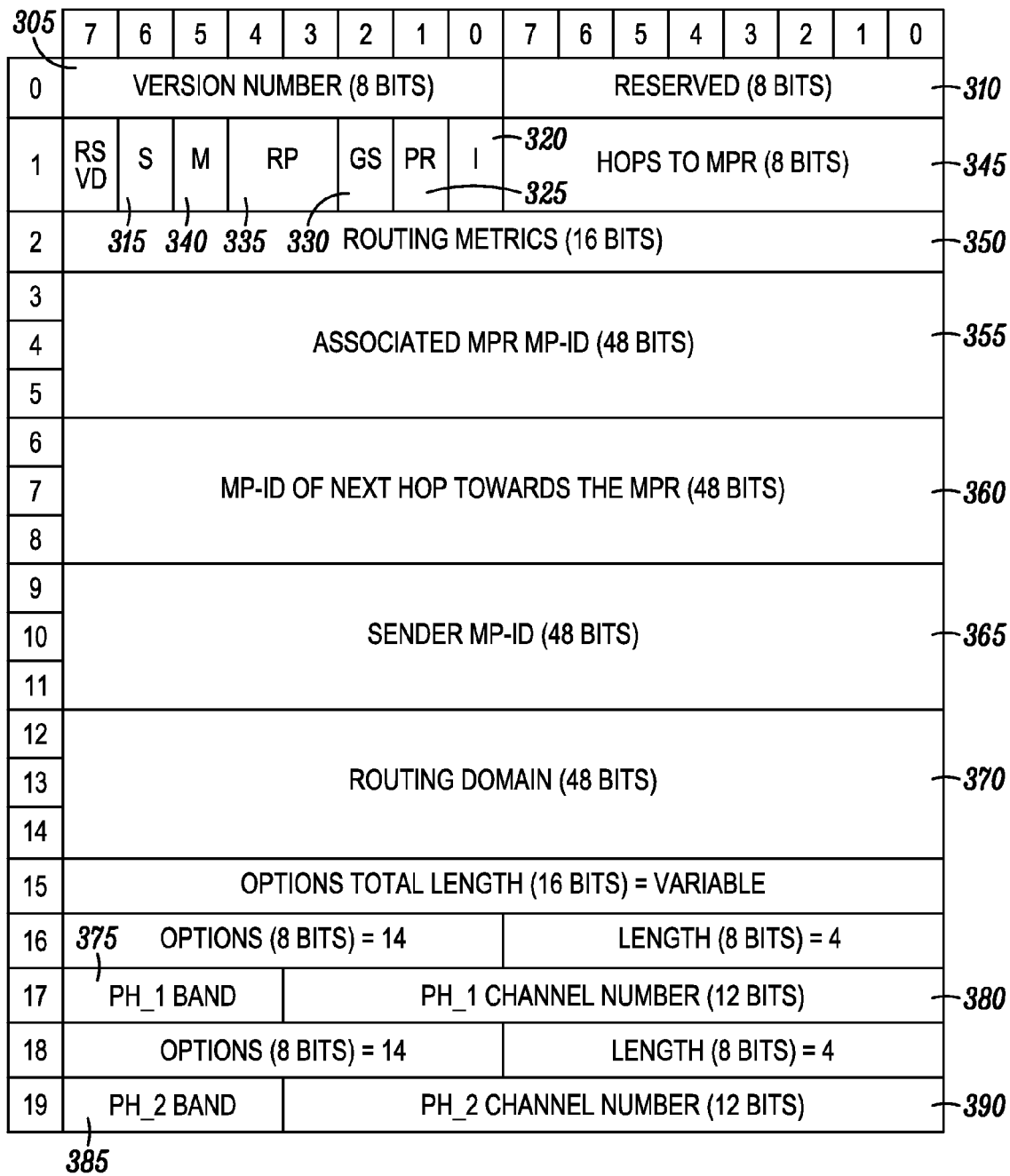
FIG. 3 illustrates a Hello message frame format in accordance with some embodiments.

FIG. 3 illustrates a Hello message frame format 300 to support auto configuration for pipelining. As illustrated, the Hello message frame format 300, for example, in an 802.11 Radio Interface, includes a number of frames and fields as described herein below.

The version number 305 identifies the version of the Hello message. The reserved field 310 is sent as a zero (0) and ignored on reception. The S field 315 indicates if the current interface (i.e. the communication link) is being used to reach a MPR. The I field 320 indicates if the MP is an MPR. The Pr field 325 indicates if the MP supports Proxies. The GS field 330 indicates if the MP is a Geo Server. The RP field 335 indicates the Routing Preference of the MP. Higher values indicate a more desirable MP for routing traffic. The M field 340 is a Mobility bit to differentiate a mobile MP and a static MP.

The Hello message frame format 300 further includes a Hops to MPR (8 bits) 345 which is the number of hops to the associated MPR. The Routing Metrics (16 bits) 350 is the routing metrics to the associated MPP. The associated MPP MP-ID (48 bits) 355 is the MP-ID of the MPR which the source is associated with. The MP-ID of next hop towards the associated MPR (48 bits) 360 is the MP-ID of the next hop to the current associated MPR. The Sender MP-ID 365 is the transmitter MP-ID. The Routing Domain (48 bits) 370 is the routing domain to identify the preferred handoff domain, e.g. the same subnet is the preferred handoff domain. It is for the handoff bias calculation.

In auto configuration mode, each MP tries to facilitate a different channel of operation compared to its two previous hop wireless neighbors towards a MPR. To do so, Hello frames sent from each MP includes a field (S bit) to indicate if the MP is currently using the link to reach MPR. It is optional for an MP to include the corresponding link metric information in Hellos.

In addition, to support pipelining over wired links, the Hello frame may include PH_1 and PH_2 option fields. In this case, PH_1 and PH_2 option will carry the channel information of two of its previous hop wireless neighbors. This way if the meshing is extended to the wired side, the next wireless link can avoid link specified by PH_1 and PH_2 options.

The PH_1 Band 375 is present to support meshing over wired link. It identifies the band of operation of the previous hop neighbor using wireless link to reach MPP (e.g. 2.4, 5.4 etc.) The PH_1 Channel Number 380 identifies the corresponding channel. The PH_2 Band 385 is present to support meshing over wired link. It identifies the band of operation of the link used by sender's 2-Hop neighbor to reach the MPR. The PH_2 Channel Number 390 identifies the corresponding channel.

Scanning Phase

During the scanning phase, each MP (including MPP) estimates channel conditions in each of its band of operation (as illustrated in Table 1 herein below). Each MP/MPR observes an average number of beacons heard during a period of time and optionally estimates the average Noise floor.

TABLE 1

Example to illustrate a 2.4 channel scan results

| Band | Channel | # Beacon's in channel (Average) | Noise Floor (optional) |
| --- | --- | --- | --- |
| 2.4 | 1 | 2 | −90 |
|  | 2 | 5 | −80 |
|  | ... | ... | ... |
|  | 11 | 0 | −90 |

In addition to collecting channel statistics, MPs also create a list of candidate MPs which could be used to reach an MPR.

MPR Procedure

Figure 4:
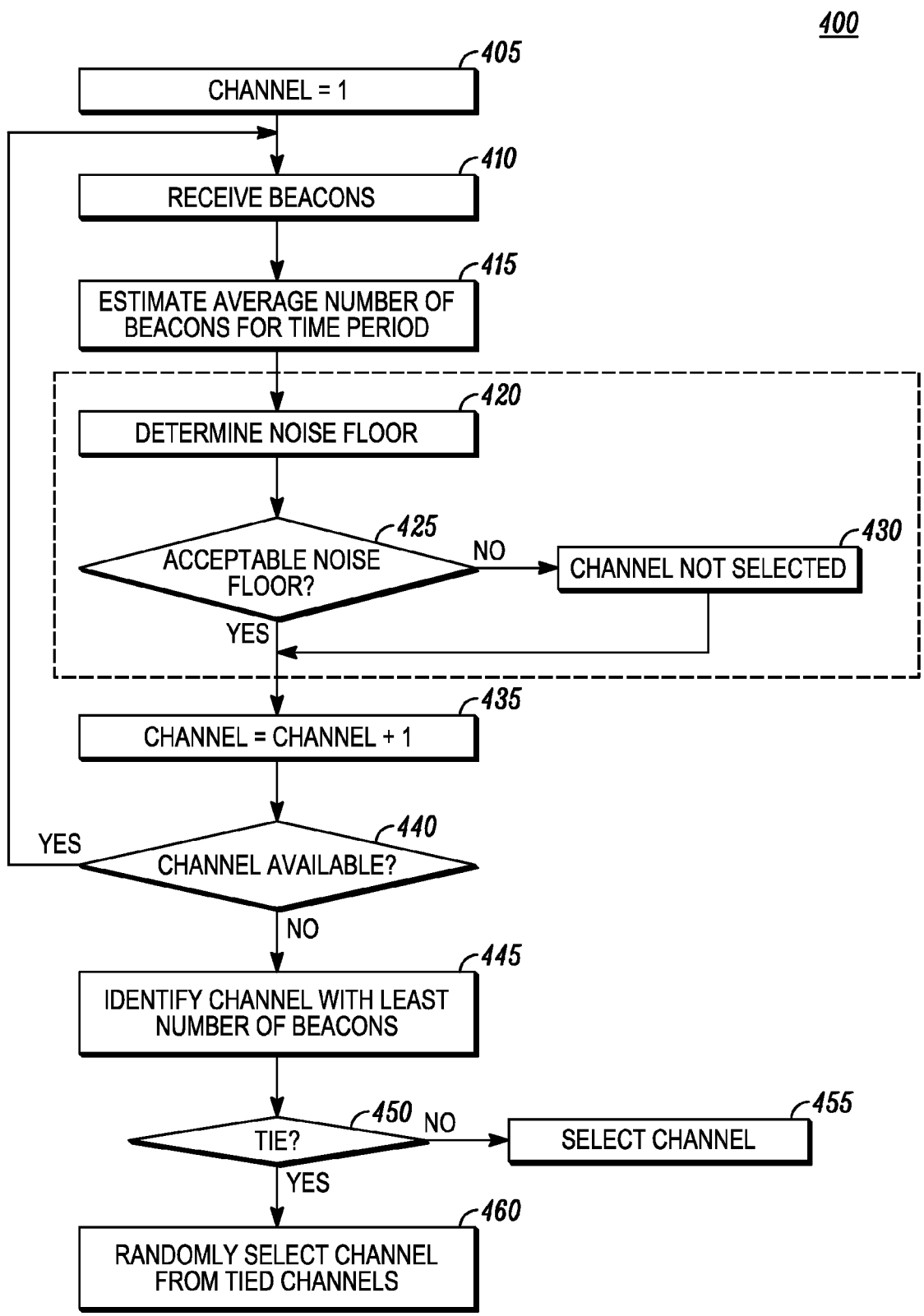
FIG. 4 is a flowchart of a method of operation of a Mesh Point Root in accordance with some embodiments.

FIG. 4 is a flowchart illustrating a method to select a channel of operation 400 of a MPR during the scanning phase in accordance with some embodiments. As illustrated in FIG. 4, the operation begins with a channel identifier set to one (1). Next, in Step 410, the MPR receives beacons on the channel. Next, in Step 415, the MPR estimates an average number of beacons received for a period of time on the channel. In some embodiments, the estimate is stored by the MPR for future reference. It will be appreciated by those of ordinary skill in the art that the period of time can be a pre-determined and/or pre-programmed period of time.

Optionally, next in Step 420, the MPR determines the noise floor of the channel. Next, optionally, in Step 425, the MPR determines if the noise floor of the channel is acceptable. In some embodiments, the acceptable noise floor level is pre-determined and/or pre-programmed into the MPR. In optional step 430, when the channel's noise floor is not acceptable, the channel is not selected for communication by the MPR. It will be appreciated that the MPR can store the noise floor associated with the channel and whether or not it is an acceptable level for future reference.

Next, when the noise floor is acceptable, and after Step 415 when the noise floor is not determined, the channel identifier is incremented by one in step 435. Next, in Step 440, the MPR determines whether the channel is available. When the channel is available, the operation cycles back to Step 410 in which the new channel's operation is determined and (optionally) stored.

When all available channels have been processed, in Step 445, the MPR identifies a channel or channels with a least number of beacons heard and with an acceptable noise floor (optional) at each radio. Next, in Step 450, the MPR determines if there is a tie (e.g. more than one channel having no beacons or same number of beacons). When there is no tie, in Step 455, the MPR selects the channel with the least number of beacons heard as its channel of operation. When there is a tie, in Step 460, the MPR randomly selects its channel of operation from the list of tied channels.

In accordance with some embodiments, the Hello frames generated from an MPR have a "S" field set to FALSE.

MP Procedure

Figure 5:
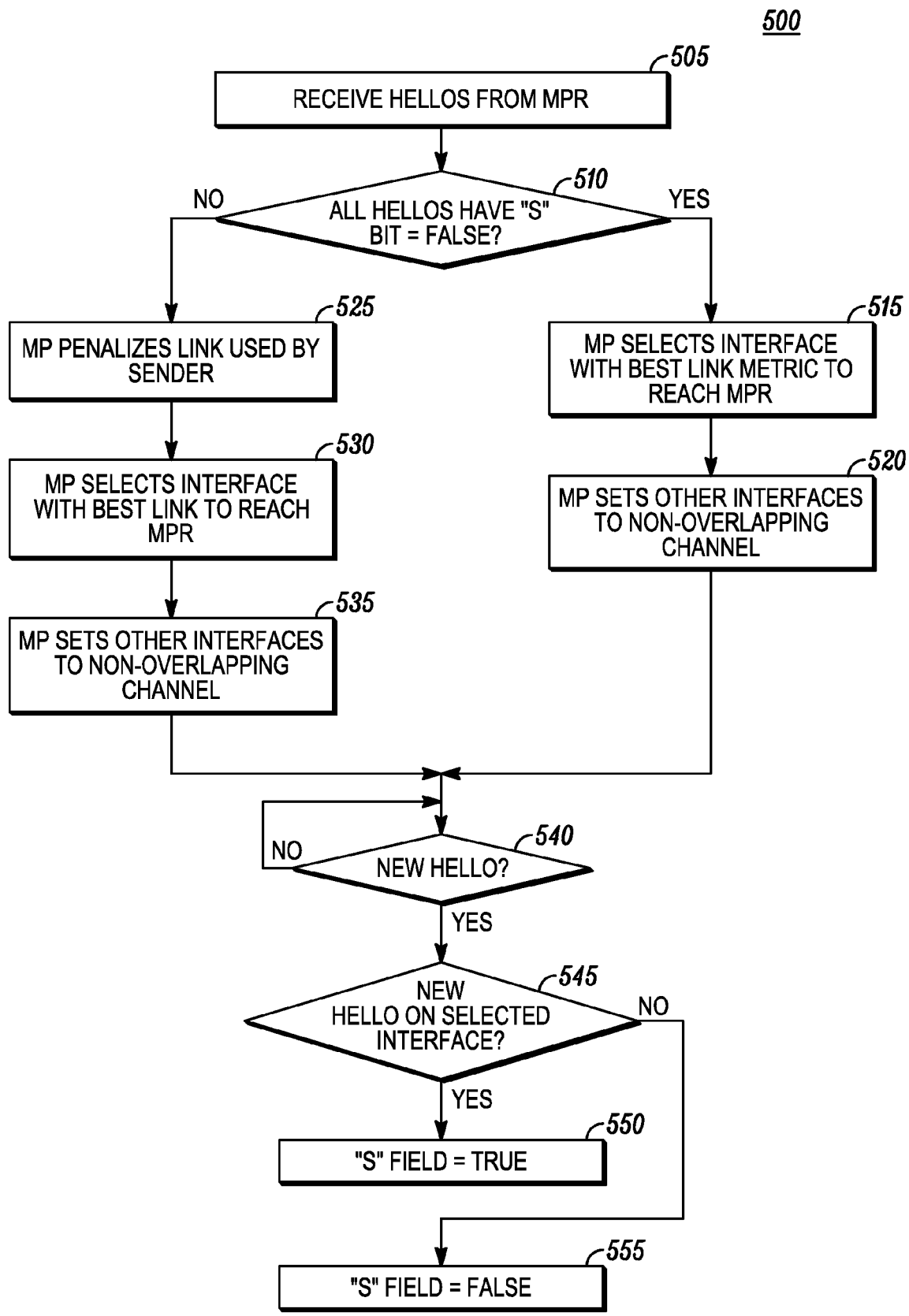
FIG. 5 is a flowchart of a method of operation of a Mesh Point in accordance with some embodiments.

FIG. 5 is a flowchart illustrating a procedure 500 for auto pipelining support within a MP in accordance with some embodiments. Specifically, the procedure of FIG. 5 illustrates the operation of an MP for a given MPR.

As illustrated, the operation 500 begins with Step 505 in which the MP receives Hellos from a particular MPR. It will be appreciate by those of ordinary skill in the art that the MP can receive one or more Hello messages directly from a particular MPR or alternatively can receive one or more Hello messages indirectly from a particular MPR through one or more neighbor devices (i.e. such as a Mesh Device) associated with the MPR.

Next, in Step 510, the MP determines if all Hellos received from the particular MPR have the "S" bit set to false. In Step 515, when all the Hellos received had the "S" bit set to false, the MP selects the interface with the best link metric to reach the MPR. Next, in Step 520, the MP sets its other interface(s) to a non-overlapping channel (different than one used to reach MPR). In one embodiment, for example, the MP can use information in Table 1 to set its other interface(s) to a non-overlapping channel.

Returning to Step 510, when the MP receives a Hello frame with at least one of the Hello with "S" set to TRUE from the MPR, the MP should try to avoid the link used by sender to reach MPR. The operation continues to Step 525 in which the MP penalizes the interface used by sender by a threshold:

If (isTrue(S)) link_metric+ = LINK_PENALTY;

entry –> route_metric = Hello·route_metric + link_metric;

Next, in Step 530, the MP selects the interface with best link metric to reach the MPR. To facilitate strict alternation interface to receive and forward frames, LINK_PENALTY can be set to a high value. Next, in Step 530, the MP sets its other interface(s) to a non-overlapping channel (different than one used by itself and its previous hop neighbor to reach the MPR). For example, in one embodiment, the MP can use information in Table 1 to set its other interface/interfaces to a non-overlapping channel.

After Steps 520 and 535, the operation continues to Step 540 in which the MP periodically determines whether or not it has generated a new Hello message. When a new Hello message has been generated, in step 545 the MP determines if the new Hello message is on the selected interface. When a Subsequent Hello is generated by the MP on the selected interface it's selected to use to reach its MPR, in step 550, that Hello message will have "S" field set to TRUE. When a subsequent Hello message is generated by the MP in other interfaces, that Hello message will have "S" field set to FALSE.

In accordance with some embodiments, when an MP receives a Hello frame from wired interface (meshing enabled), and selects the wired interface to reach the MPR, it sets the "S" field to TRUE in its subsequent hellos in wired interface. In addition, it can use PH_1 and PH_2 options in Hellos to indicate the link information of one and two previous hop MPs.

In accordance with some embodiments, an MP can request its previous hop to change its channel of operation (after setting up a link), if it detects its current channel of operation is not acceptable. The MP can provide a list of channels (or a list of channel which should be blocked) to its previous hop.

Figure 6:
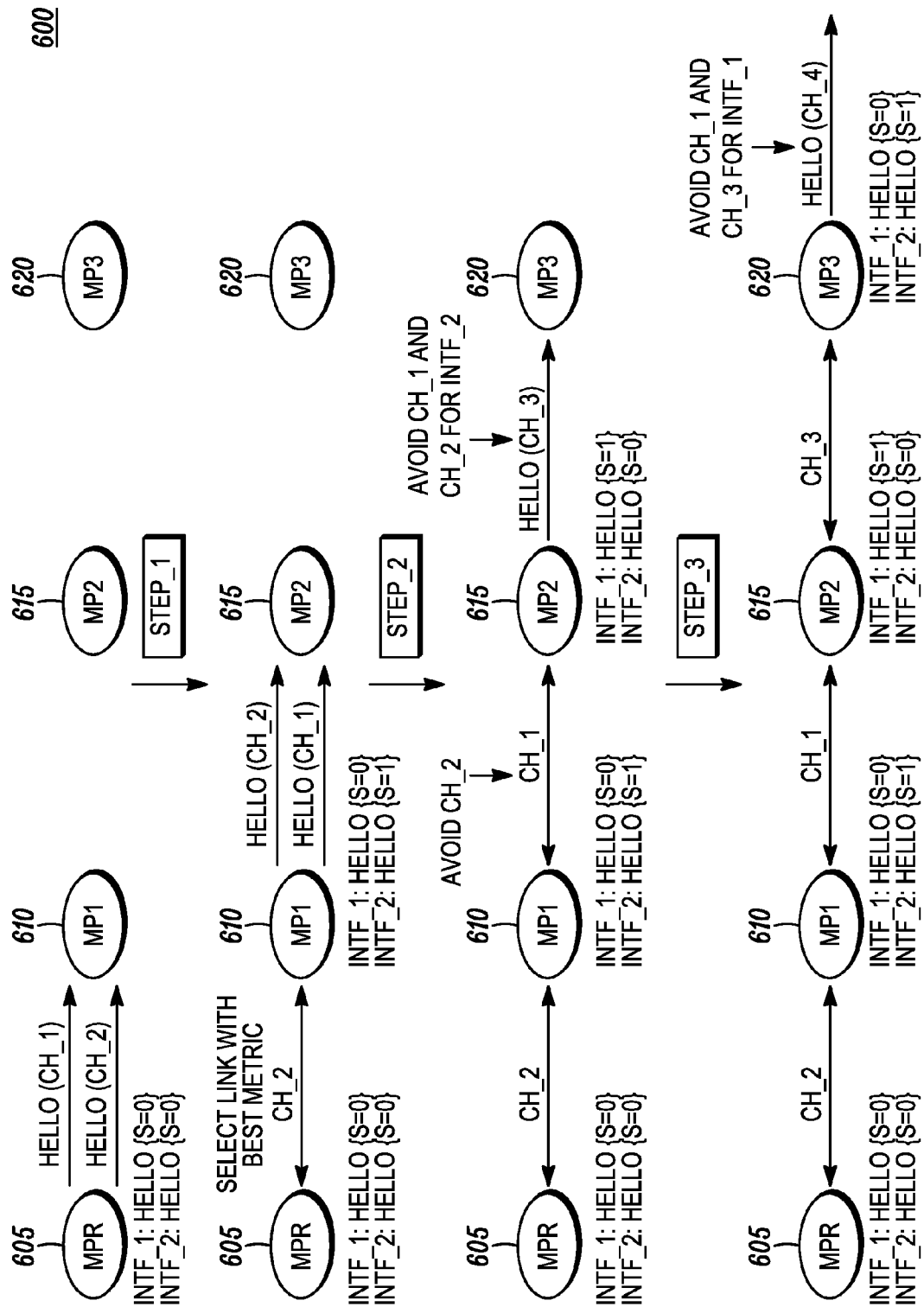
FIG. 6 illustrates an example of the implementation of the operation of a wireless communication network in accordance with some embodiments.

FIG. 6 illustrates an example scenario of an operation of a portion of a Mesh Network in pipelining using auto configuration. As illustrated, a Mesh Network 600 includes a Mesh Point Root (MPR) 605, a first Mesh Point (MP1) 610, a second Mesh Point (MP2) 615, and a third Mesh Point (MP3) 620. The first Mesh Point (MP1) 610 is a next hop from the MPR 605. MP2 615 is two hops from the MPR 605 through MP1 610. MP3 is three hops from MPR 605 through MP1 610 and MP2 615.

As illustrated, MPR 605 broadcasts a Hello with S=0 on Channel 1 and a Hello with S=0 on Channel 2.

Next, MP1 610 selects the link with the best metric which is Channel 2 in this example. MP1 610 will now communicate with MPP 605 on Channel 2. MP1 610 then broadcasts a Hello on Channel 2 with S=1, and a Hello on Channel 1 with S=0.

Next, MP2 615, wanting to avoid Channel 2 since the Hello had S=1, selects Channel 1 to communicate with MP1 610. MP2 615 then broadcasts a Hello on Channel 3 in order to avoid Channel 1 and Channel 2 for interference.

Next, MP3 620 selects Channel 4 to communicate to other MPs since it wants to avoid Channel 1 and Channel 3 for interference.

The route metric approach of the embodiments as described previously herein provides the flexibility to do a strict alternation of channel in two hop neighbors as well as allows the selection of a same channel for uplink and downlink if needed. For example for some scenarios and for a dual radio node, it would be beneficial to use 5.x radio for both uplink and downlink traffic if all the 2.4 link suffers increased interference. In addition, the method of some embodiments extends seamlessly to support a wired link mesh network.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for selecting a communication interface towards an access point by a wireless communication device, the method comprising:
    receiving one or more HELLO messages from the access point on one or more of a plurality of communication links, wherein data and control traffic are combined on the communication links, and wherein the HELLO message comprises a plurality of channel identifications and an S field which identifies whether or not a wireless communication device is utilizing an identified channel to reach the access point;
    determining whether any of the plurality of channels identified within the one or more HELLO messages is being used by one or more previous hop wireless communication devices to reach the access point by evaluating at least one field of each of the HELLO messages received from the access point;
    penalizing a link metric of a channel when the channel is being used by one or more previous hop wireless communication devices to reach the access point; and
    selecting a communication interface towards the access point, wherein the selected communication interface is coupled to a best channel having a best link metric.

2. The method as claimed in claim 1, wherein the wireless communication device comprises a mesh point and the access point comprises a mesh point root.

3. The method as claimed in claim 1, wherein the wireless communication device comprises a multi-radio wireless communication device.

4. The method as claimed in claim 1, wherein the S field is set to TRUE when the channel is being used to reach the access point and further wherein the S field is set to FALSE when the channel is not being used to reach the access point.

5. The method as claimed in claim 1, further comprising:
    setting one or more other channels of the wireless communication device to a non-overlapping channel.

6. The method as claimed in claim 5, further comprising:
    selecting the non-overlapping channel using channel conditions for each non-overlapping channel estimated during a channel scan.

7. The method as claimed in claim 1, wherein penalizing the link metric comprises adding a link penalty to a HELLO route metric.

8. The method as claimed in claim 6, wherein the link penalty is set to a high value to disable selection of a penalized channel.

9. The method as claimed in claim 1, comprising repeating the determining, penalizing, and selecting steps for each of a new HELLO message generated by the wireless communication device.

10. The method as claimed in claim 1, wherein each of the HELLO messages further comprises link channel information for one or more previous hop communication devices, wherein the selecting of the communication interface further comprises avoiding a communication interface utilized by one or more previous hop communication devices.

11. The method as claimed in claim 1, wherein at least one of the HELLO messages is communicated over a wired interface, wherein the at least one HELLO message communicated over the wired interface further comprises link information for one or more previous hop communication devices, the method further comprising:
- selecting the wired interface by the wireless communication device; and
- sending a further communication including the link information for the one or more previous hop wireless communication devices.

12. The method as claimed in claim 1, further comprising:
providing a list of channels of operation in use by the wireless communication device to one or more previous hop communication devices.

13. The method as claimed in claim 12, further comprising:
requesting a previous hop wireless communication device change its channel of operation when it interferes with the provided list of channels of operation.

14. A method for selecting channels along a multi-hop path from an access point through a plurality of multi-radio wireless communication devices, the method comprising:
at each of the plurality of multi-radio wireless communication devices:
receiving one or more HELLO messages from the access point on one or more of a plurality of communication links, wherein data and control traffic are combined on the communication links, and wherein the HELLO message comprises a plurality of channel identifications and an S field which identifies whether or not a wireless communication device is utilizing an identified channel to reach the access point;
determining whether any of the plurality of channels identified within the one or more HELLO messages is being used by one or more previous hop wireless communication devices to reach the access point by evaluating at least one field of each of the HELLO messages received from the access point;
penalizing a link metric of a channel when the channel is being used by one or more previous hop wireless communication devices to reach the access point; and
selecting a communication interface towards the access point, wherein the selected communication interface is coupled to a best channel having a best link metric.

* * * * *